Nov. 16, 1926.
R. HILDEBRAND
INTERNAL COMBUSTION ENGINE
Filed August 26, 1922     2 Sheets-Sheet 1
1,607,398
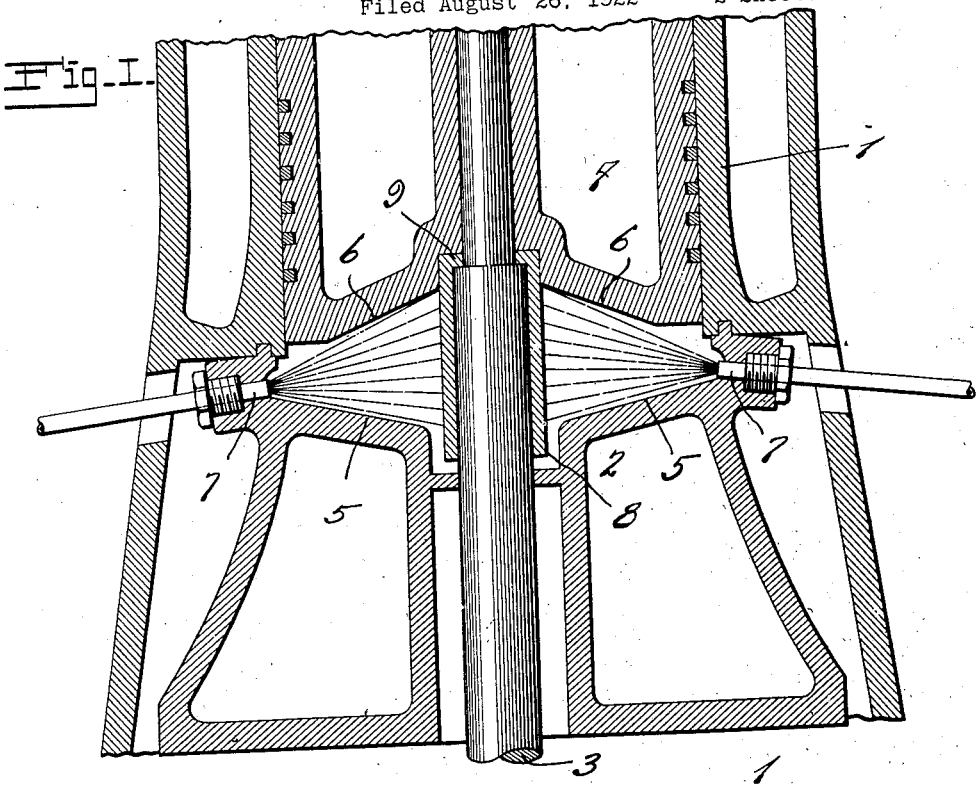
Fig. I.
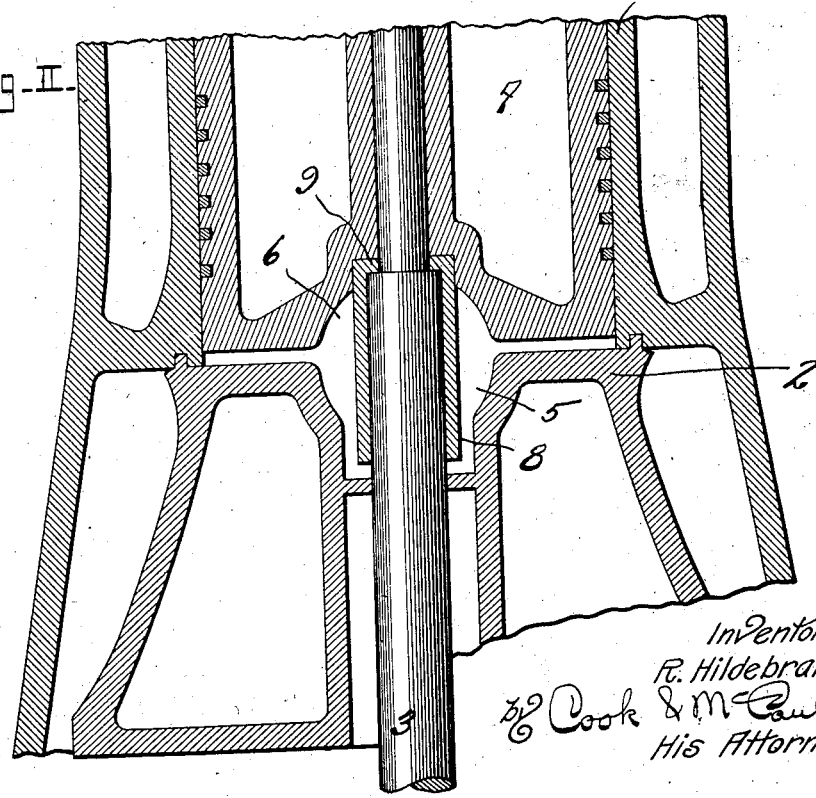
Fig. II.
Inventor:
R. Hildebrand,
by Cook & McCauley
His Attorneys.

Nov. 16, 1926.                                         1,607,398
                       R. HILDEBRAND
                   INTERNAL COMBUSTION ENGINE
              Filed August 26, 1922    2 Sheets-Sheet 2
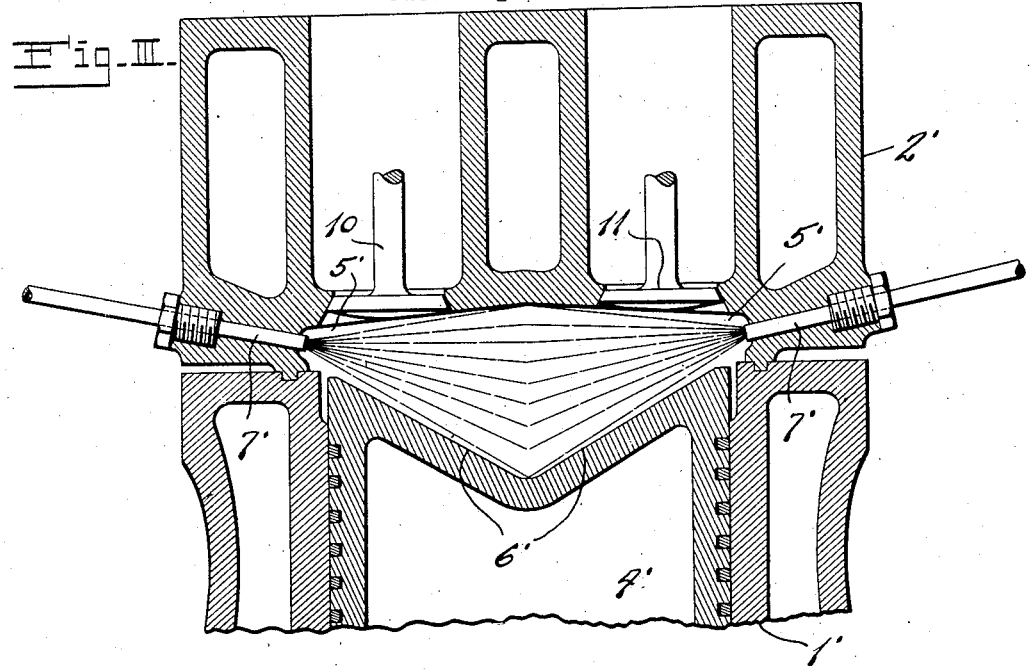
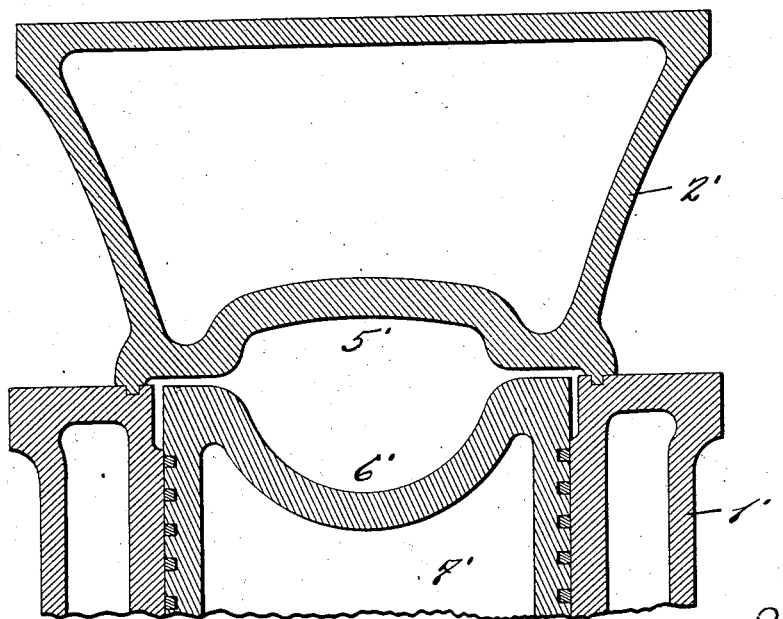
Inventor:
R. Hildebrand,
by Cook & McCauley
His Attorneys.

Patented Nov. 16, 1926.

1,607,398

UNITED STATES PATENT OFFICE.

REINHARD HILDEBRAND, OF WEBSTER GROVES, MISSOURI, ASSIGNOR TO FULTON IRON WORKS COMPANY, OF ST. LOUIS, MISSOURI, A CORPORATION OF DELAWARE.

INTERNAL-COMBUSTION ENGINE.

Application filed August 26, 1922. Serial No. 584,488.

This invention relates to improvements in internal combustion engines, and the novel features are adapted for use in an engine of the Diesel type having a fuel-injecting nozzle which discharges a tapering spray of fuel into the combustion chamber.

One of the objects of the invention is to produce a simple and efficient engine of this kind having a combustion chamber conforming approximately to the shape of the tapering spray of fuel, so that the finely divided mass of fuel will be distributed throughout the air in the combustion chamber, thereby producing a highly combustible mixture. More specifically stated, the object is to economize in space and material by forming the desired combustion chamber without producing a large or complex cylinder head, and this object is accomplished by forming the tapering combustion chamber partly in the piston and partly in the cylinder head. The piston and cylinder head may be provided with simple tapering cavities disposed opposite to each other to provide a combustion chamber approximately in the form of a cone. Simple cavities of this kind can be readily formed without enlarging or complicating the cylinder head, and the walls of the combustion chamber are free to expand and contract without danger of causing a fracture in the cylinder head. Furthermore, if the piston is not artificially cooled, the efficiency of the fuel charge will be materially increased by the heat transmitted from the walls of the cavity in the piston.

In the preferred form of the invention, a continuous combustion chamber, substantially in the form of a double cone, is formed by the cavities in the piston and cylinder head, and oppositely disposed nozzles are used to inject conical sprays of liquid fuel into the small ends of these combustion chambers.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a vertical section illustrating parts of a double-acting internal combustion engine embodying the features of this invention.

Fig. II is a vertical section taken approximately through the middle of Fig. I.

Fig. III is a view similar to Fig. I, showing a single-acting engine constructed in accordance with the invention.

Fig. IV is a vertical section taken through the middle of Fig. III.

Figs. I and II illustrate portions of a double-acting engine comprising a cylinder 1 having a head 2, a piston rod 3 secured to the piston 4 and extending through the head 2.

The head 2 and the lower end face of the piston 4 are provided with transverse cavities 5 and 6 flaring toward the piston rod at the center line of the cylinder. The flaring cavities 6 in the end face of the piston are disposed opposite to the flaring cavities 5 in the head to provide a flaring combustion chamber having opposing walls substantially in the form of a double cone flaring inwardly from marginal portions of said head and end face. The flaring cavities 6 in the piston are preferably alined with each other and the same is true of the flaring cavities 5 in the cylinder head, so the walls of the tapering combustion chamber flare inwardly from diametrically opposite portions of the structure. Fuel-injecting nozzles 7, mounted in the cylinder head 2, are located diametrically opposite each other and their discharge ends lie at the small ends of the combustion chamber, said nozzles being in alinement with the combustion chamber. When the end face of the piston 4 lies adjacent to the cylinder head 2, the fuel is injected into the opposite ends of the tapering combustion chamber, and the sprays issuing from the nozzles are substantially conical, as suggested by Fig. I, so as to conform approximately to the shape of the combustion chamber. The sprays of finely divided oil are thus distributed throughout the combustion chamber and thoroughly commingled with the air therein to produce a highly efficient combustible mixture.

Since the tapering combustion chamber is formed partly by deep, elongated cavities in the piston, it will be understood that the desired result can be obtained without using a large, complicated cylinder head, and that the charge is more effectively exposed to the heat transmitted from the piston. The incoming charge is sprayed toward the piston rod 3, and to avoid dangerous overheating of the rod a shield 8 is interposed between the nozzles and the rod, said shield being preferably in the form of a sleeve located adjacent to the piston and surrounding the piston rod, as shown by Figs. I and II. To secure the sleeve, its upper end may be provided with an inturned annular flange 9 surrounding a reduced portion of the piston rod and interposed between shoulders on the rod and piston.

Figs. III and IV illustrate a single-acting internal combustion engine having a cylinder 1', a cylinder head 2', and a piston 4' mounted in the cylinder. 10 designates a valve adapted to control the admission of air to the cylinder, and 11 is an exhaust valve. These valves may be mounted in the cylinder head, as shown by Fig. III, and they may be provided with any suitable operating means.

A combustion chamber, substantially in the form of a double cone, is formed partly by cavities 5' in the cylinder head and partly by cavities 6' in the end face of the piston. 7' designates fuel-injecting nozzles having their discharge ends located at the small ends of the combustion chamber, so as to discharge substantially conical sprays of fuel conforming to the combustion chamber, as shown by Fig. III.

In a single-acting, 4-cycle engine of the Diesel type, the inlet and exhaust valves are most conveniently located in the cylinder head, and the advantages of the present invention are not materially sacrificed by locating these valves in their usual positions, for the flaring combustion chamber is formed partly in the piston, instead of being entirely in the cylinder head.

I claim:—

1. An internal combustion engine provided with a cylinder having a head, a piston having an end face disposed opposite to said head to form a combustion chamber, said end face having deep, elongated, transverse cavities flaring inwardly from marginal portions of said end face to provide flaring walls for said combustion chamber, and fuel-injecting nozzles adapted to discharge flaring sprays of fuel into the deep, elongated, flaring cavities, the discharge ends of said nozzles being adjacent to the small ends of said flaring cavities when the piston lies adjacent to said head and the size and shape of said cavities adhering closely to the size and shape of the sprays of fuel discharged thereinto by the associated nozzles whereby said sprays are distributed throughout the entire cavities.

2. An internal combustion engine provided with a cylinder having a head, a piston having an end face disposed opposite to said head, said end face and head being provided with transverse cavities flaring toward the center line of the cylinder, the flaring cavities in said head being disposed opposite to the flaring cavities in said end face to provide a combustion chamber having opposing walls substantially in the form of a double cone flaring inwardly from marginal portions of said head and end face, the cavities in said end face of the piston being elongated to extend approximately from one side of the piston to the other, and fuel-injecting nozzles adapted to discharge substantially conical sprays of fuel into the small ends of said combustion chamber, the size and shape of said cavities adhering closely to the size and shape of the sprays of fuel being discharged thereinto by the associated nozzles whereby said sprays of fuel are distributed throughout the entire cavities.

3. An internal combustion engine provided with a cylinder having a head, a piston having an end face disposed opposite to said head to form a combustion chamber, a piston rod extending from said piston and passing through said head, said combustion chamber having tapering walls flaring inwardly to said piston rod so as to provide a tapering space for the fuel, and a fuel-injecting nozzle adapted to discharge a flaring spray of fuel into said combustion chamber, the discharge end of said nozzle being at the small end of said combustion chamber and directed toward said piston rod.

4. An internal combustion engine provided with a cylinder having a head, a piston having an end face disposed opposite to said head to form a combustion chamber, a piston rod extending from said piston and passing through said head, said piston having transverse cavities flaring inwardly from marginal portions of said end face to said piston rod so as to provide flaring walls for said combustion chamber, and oppositely disposed fuel-injecting nozzles arranged to discharge flaring sprays of fuel toward said piston rod, the discharge ends of said nozzles being adjacent to the small ends of said flaring cavities when the piston lies adjacent to said head.

5. An internal combustion engine provided with a cylinder having a head, a piston having an end face disposed opposite to said head to form a combustion chamber, a piston rod extending from said piston and passing through said head, said combustion chamber having tapering walls flaring inwardly to said piston rod so as to provide a tapering space for the fuel, a fuel-injecting nozzle adapted to discharge a flaring spray of fuel into said combustion chamber, the discharge end of said nozzle being at the small end of said combustion chamber and directed toward said piston rod, and a protective shield interposed between said piston rod and the discharge end of said nozzle.

6. An internal combustion engine provided with a cylinder having a head, a piston having an end face disposed opposite to said head to form a combustion chamber, a piston rod extending from said piston and passing through said head, said combustion chamber having tapering walls flaring inwardly to said piston rod so as to provide a tapering space for the fuel, a fuel-injecting nozzle adapted to discharge a flaring spray of fuel into said combustion chamber, the discharge end of said nozzle being at the small end of said combustion chamber and directed toward said piston rod, and a protective shield interposed between said piston rod and the discharge end of said nozzle, said shield being in the form of a sleeve surrounding and secured to said piston rod.

In testimony that I claim the foregoing I hereunto affix my signature.

REINHARD HILDEBRAND.